(12) United States Patent
Kim (10) Patent No.: US 12,543,895 B2
(45) Date of Patent: Feb. 10, 2026

(54) DETACHABLE PAN HANDLE DEVICE WITH IMPROVED STRUCTURE

(71) Applicant: CHANGSHU KASMAIN COOKWARE CO., LTD, Changshu (CN)

(72) Inventor: Jong Moon Kim, Changshu (CN)

(73) Assignee: CHANGSHU KASMAIN COOKWARE CO., LTD, Changshu (CN)

( * ) Notice: Subject to any disclaimer, the term of this patent is extended or adjusted under 35 U.S.C. 154(b) by 0 days.

(21) Appl. No.: 18/640,178

(22) Filed: Apr. 19, 2024

(65) Prior Publication Data

US 2025/0143516 A1 May 8, 2025

(30) Foreign Application Priority Data

Nov. 3, 2023 (CN) .......................... 202311453550.4

(51) Int. Cl.
*A47J 45/07* (2006.01)
(52) U.S. Cl.
CPC .................................. *A47J 45/071* (2013.01)
(58) Field of Classification Search
CPC ............................. A47J 45/071; A47J 45/07
USPC ........................................................ 220/759
See application file for complete search history.

(56) References Cited

U.S. PATENT DOCUMENTS

| 8,235,245 | B2 * | 8/2012 | Lorthioir | A47J 45/10 |
| | | | | 220/759 |
| 9,125,524 | B2 * | 9/2015 | Cuillery | A47J 45/10 |
| 2014/0158698 | A1 * | 6/2014 | Bonnel | A47J 27/00 |
| | | | | 220/573.1 |
| 2014/0239654 | A1 * | 8/2014 | Cuillery | A47J 45/07 |
| | | | | 294/31.1 |
| 2019/0008329 | A1 * | 1/2019 | Chan | A47J 45/071 |
| 2022/0211218 | A1 * | 7/2022 | Bouvet | A47J 45/071 |

(Continued)

FOREIGN PATENT DOCUMENTS

| FR | 2842717 A1 * | 1/2004 | ............ A47J 45/10 |
| FR | 2842718 A1 * | 1/2004 | ............ A47J 45/10 |
| KR | 883904 B1 * | 2/2009 | |

(Continued)

*Primary Examiner* — Ernesto A Grano
*Assistant Examiner* — Symren K Sanghera
(74) *Attorney, Agent, or Firm* — HOWARD M COHN and Associates, LLC (57) ABSTRACT

Disclosed is a detachable pan handle device with an improved structure, including a handle body, having a handle clamp seat formed thereon and a handle inner matching groove formed therein; a press transmission member pivotally connected with the handle body; a locking member provided in the handle body and locked therewith, and rotatably connected to the press transmission member; a hand-press handle integrally arranged at a lower portion of the handle body and cooperatively connected to a handle inner matching groove, where a hand-press handle snap-fit board is provided in the hand-press handle inner cavity, and the locking member is cooperatively locked with the hand-press handle snap-fit board; a rake passing through and pivotally connected with the handle clamp seat and provided with a rake positioning portion fixed on the hand-press handle, where one end of the rake positioning portion is folded downwards to form a rake claw portion.

10 Claims, 4 Drawing Sheets

(56) References Cited

U.S. PATENT DOCUMENTS

2023/0218117 A1 * 7/2023 Yang .................... A47J 45/071
16/425

FOREIGN PATENT DOCUMENTS

| KR | 20110007035 U | * | 7/2011 | ............ A47J 45/072 |
| KR | 102409582 B1 | * | 6/2022 | ............ A47J 45/085 |
| WO | WO-2009136678 A1 | * | 11/2009 | ............ A47J 45/071 |

* cited by examiner

DETACHABLE PAN HANDLE DEVICE WITH IMPROVED STRUCTURE

TECHNICAL FIELD

The present disclosure relates to the technical field of cooking utensils, and particularly relates to a detachable pan handle device with an improved structure.

BACKGROUND

The pan, known as a cooking utensil with a long history, can be used for cooking, boiling, decocting, frying and the like. The pan has a long history of use and is an indispenscapable tool for the Chinese people to cook. The pan used for cooking may contain a whole set of cooking ware, such as a frying pan, a milk pan, a frying pan, etc. In addition, a pan handle is one of the most important component parts of the pan, and it is necessary to seek for help from the pan handle no matter whether holding the pan body by hands or stir-frying the food in the pan during cooking. However, most of the existing pan handle structures are fixed types, which are usually mounted on a pan body by using a screw-fixed structure, and the present pan handle is generally a one-handed hand-held type, which is convenient for holding the handle with one hand for toss frying, and the other hand controls fire and adds various spices at any time. However, when cooking on a strong fire, the flame tends to rise up to cause the pan handle to be burnt and deform, which greatly limits lengthening the service life of the pan body with a fixed handle, and the pan handle is also easily damaged. Once the handle is damaged, the whole pan will be useless accordingly, which results in a great waste, as well as a great waste of kitchen space due to the large space occupied by placing the pan with a handle, and also results in disorder of the overall space. However, in order to solve this problem, some pans with handles that can be quickly detached are also available on the market. The detachable pan handles allow a set of pans of each size to be equipped with only one pan handle.

In general, the existing detachable pan handles are fixed in two structural forms of claw fixing and lever type two-point support fixing due to the common features of the two forms: the handle can be detached immediately, replaced conveniently, save space and be replaced easily, at the same time, the service life may also be extended, but the lever type is more easily to cause safety risks because it cannot reliably fix the pan body. In addition, the Chinese patent for invention grant publication No. CN 213551405U discloses "a detachable pan handle", for which a claw fixing connection method is used, but there are common disadvantages of the claw-fixed pan handle device: i.e., an inner structure is very complex and inconvenient to assemble, as well as the number of parts is large, the cost is high, and the mounting and maintenance is inconvenient. At the same time, if the pan body is heavy, and a user cannot hold an upper handle and a lower handle well, they are particularly easy to slide relative to each other and accidentally detach, so there is a considerable security risk. Moreover, a large number of fittings and fasteners in the existing detachable pan handle structure are externally disposed, which, on one hand, obstructs the view and causes an unaesthetic view of the overall structure, and, on the other hand, causes inconvenience for the user to hold the handle, affecting the use effect.

In view of the above, there is a need for a reasonable improvement of the existing detachable pan handle structure to solve the problems of complicated structure, inconvenience in use, poor aesthetics and poor safety of the existing pan handle device. For this reason, the applicant has made an active and effective exploration to form the technical solution to be described below.

SUMMARY

A task of the present disclosure is to provide a detachable pan handle device with an improved structure, which helps to simplify a locking structure to reduce the number of components and improve the mounting convenience and the reliability in use and helps to ensure the neatness and aesthetic of the overall structure and effectively improve the visual perception by embedding the components in the handle, and which facilitates the optimization of the connection structure of a rake and the hand-press handle, thereby further improving the convenience in use and the safety after accidental release.

The task of the present disclosure is accomplished by providing a detachable pan handle device with an improved structure, including a handle body, where the interior of the handle body is hollow and a handle hollow cavity is formed in the interior of the handle body, a lower portion of the handle body is of an opening type design, a handle clamp seat is formed at one end of the handle body in the length direction, and a handle inner matching groove is also formed in the handle hollow cavity and at one end away from the handle clamp seat; a press transmission member, where the press transmission member penetrates at an upper position of the handle body, and an upper portion of the press transmission member is exposed at an upper portion of the handle body, and a lower portion of the press transmission member is arranged in the handle hollow cavity and is pivotally connected with the handle body; a locking member, where the locking member is integrally provided in a handle hollow cavity and can be locked together with the handle body, and one end of the locking member in the length direction is rotatably connected to a lower end of the press transmission member; a hand-press handle, where the hand-press handle is integrally arranged at a lower opening of the handle body and can rotate at the opening, and one end of the hand-press handle in the length direction penetrates into the hand-press handle clamp seat, and the top part of the other end of the hand-press handle in the length direction can be cooperatively connected to the handle inner matching groove, and the interior of the hand-press handle is hollow and a hand-press handle inner cavity is formed in the interior of the hand-press handle, the lower part of the press transmission member and the locking member are arranged in the hand-press handle inner cavity, and a hand-press handle snap-fit board is further arranged in the hand-press handle inner cavity; one end of the locking member away from the press transmission member can be cooperatively locked with the hand-press handle snap-fit board; a rake, where the rake passes through the handle clamp seat and is pivotally connected together with the handle clamp seat, and the rake is provided with a transversely arranged rake positioning portion, the rake positioning portion is fixedly mounted on one end of the hand-press handle, and one end of the rake positioning portion away from the hand-press handle is folded downwards to form a rake claw portion corresponding to the handle clamp seat, and the rake claw portion and the handle clamp seat work together to achieve a clamping operation on an edge of an opening of the pan body.

In one specific embodiment of the present disclosure, a press key positioning groove penetrating into the handle hollow cavity is formed at an upper portion of the handle body; and the press transmission member includes a press key body, a press key positioning board and a transmission connection portion, where the press key body passes through the press key positioning groove and can reciprocate therein, the press key positioning board is formed at the bottom of the press key body, the press key positioning board is located at a position below the press key positioning groove, and the transmission connection portion is formed at a position below one end of the press key positioning board close to the handle clamp seat, and the press key positioning board and the transmission connection portion are both accommodated in the handle hollow cavity, and the transmission connection portion is pivotally connected with the handle body.

In another specific embodiment of the present disclosure, a transmission connection portion shaft hole penetrating the left and right ends of the press transmission member is formed on the transmission connection portion of the press transmission member, a transmission connection portion pivot shaft is provided in the transmission connection portion shaft hole, the left and right ends of the transmission connection portion pivot shaft penetrate into the handle body respectively and are rotatably connected together, achieving the transmission connection between the press transmission member and the handle body; a press transmission member reset spring is further provided on the transmission connection portion, and two ends of the press transmission member reset spring respectively abut against the transmission connection portion body and an inner side wall of the handle hollow cavity; and a pair of transmission connection portion lug seat boards are further formed on one end of the transmission connection portion close to the locking member, two transmission connection portion lug seat boards are arranged at intervals, and a locking member connection groove is further formed between the two transmission connection portion lug seat boards, one end of the locking member in the length direction is cooperatively provided in the locking member connection groove, and the ends of the locking member are connected to the two transmission connection portion lug seat boards by a locking member connection shaft.

In still another specific embodiment of the present disclosure, the locking member is constructed in an elongated shape as a whole, and a locking member snap-fit portion is formed by bending at one end away from the press transmission member of the locking member in the length direction, the locking member snap-fit portion is provided with a vertically arranged locking member snap-fit portion transition section and a laterally arranged locking member snap-fit portion lateral section, and a vertically arranged handle inner locking board is further provided in the handle hollow cavity, a handle locking hole is further formed on the handle inner locking board, and the locking member snap-fit portion lateral section can cooperatively penetrate the handle locking hole, and when in a locked state, the locking member snap-fit portion lateral section snap-fit board can be cooperatively locked with an upper edge of the hand-press handle snap-fit board.

In further another specific embodiment of the present disclosure, a hand-press handle connection block extending toward the rake is provided at one end of the hand-press handle in the length direction close to the handle clamp seat, the hand-press handle connection block passes through the handle clamp seat, the rake positioning portion is located at a position above the hand-press handle connection block, and the rake positioning portion can be fixedly connected to the hand-press handle connection block by a fastener.

In yet another specific embodiment of the present disclosure, a pair of rake pivot connection boards are formed on the left and right side edges of the rake positioning portion of the rake in an upward direction, two rake pivot connection boards are arranged opposite to each other, and a rake pivot shaft is further provided between the two rake pivot connection boards, the rake pivot shaft is cooperatively mounted together with the two rake pivot connection boards, and the left and right ends of the rake pivot shaft are rotatably connected together with the handle body to realize the pivot connection between the rake and the handle body; and a rake releasing torsion spring is also sleeved on the shaft body of the rake pivot shaft, the rake releasing torsion spring is arranged between the two rake pivot connection boards, and a part of the body of the rake releasing torsion spring abuts against the inner side wall of the handle hollow cavity, and a pair of torsion spring feet of the rake releasing torsion spring are also embedded on the rake positioning portion, and the rake releasing torsion spring is configured to assist the rake to perform a release operation.

In yet still another specific embodiment of the present disclosure, a sleeve cavity is formed below the handle clamp seat and a sleeve is fixedly mounted on the sleeve cavity; and a sleeve fillet is formed at the top positions of the two sides of the sleeve, and a sleeve cavity caulking groove adapted to the shape of the sleeve fillet is correspondingly provided on the sleeve cavity, and the sleeve fillet and the sleeve cavity caulking groove can be fitted with each other to fixedly mount the sleeve on the handle clamp seat.

In a more specific embodiment of the present disclosure, the handle clamp seat is provided with a rake sliding groove penetrating the handle inner cavity, the rake positioning portion penetrates through the rake sliding groove into the handle inner cavity, and a clamp seat step is further formed at the front end of the handle clamp seat.

In still another more specific embodiment of the present disclosure, a handle hanging hole is formed at one end of the handle body in the length direction away from the handle clamp seat, and the handle hanging hole penetrates the handle body in the thickness direction.

In yet still a more specific embodiment of the present disclosure, rake claw portion silica gel is sleeved on the rake claw portion.

The present disclosure has advantageous effects due to the above-mentioned structure: firstly, in this structure, the hand-press handle can be locked with the handle body through the handle inner matching groove, and at the same time, the hand-press handle can be snap-fit with the locking member snap-fit portion lateral section of the locking member, and the locking structure is simple and reliable; the end of the hand-press handle is directly connected to the rake, and the hand-press handle can directly drive the rake to rotate, which greatly simplifies the assembly structure, has a small number of components in all, is easy to mount, is reliable of use and is easy to maintain. Secondly, by providing a press transmission member with a transmission connection portion, and connecting the locking member and the transmission connection portion together, the press transmission member can easily and quickly drive the movement of the locking member, and achieve the disengagement or locking of the locking member and the hand-press handle, and can quickly achieve opening or matching of the rake claw portion of the rake and the handle clamp seat and complete the clamping or opening of the edge of the pan, and the operation is simple and labor-saving, the design is standardized and miniaturized, and the user's experience of use can also be improved; thirdly, the hand-press handle and the locking member inside the device are provided in the handle hollow cavity, and are not exposed, and the overall structure is neat and beautiful, which can effectively improve the visual perception. Fourthly, since a structure of directly connecting the hand-press handle with the rake is used, the rake is prevented from being opened accidentally under the condition of being held by one hand, the hand-press handle must be released by one hand while the other hand presses the press transmission member to open the pan handle device, thus improving the safety of use, even if the press transmission member is touched accidentally, the handle cannot be disengaged from the handle body under the holding condition, further improving the safety of use of the pan handle device as a whole.

In the drawings: 1. handle body; 11. handle hollow cavity; 12. handle clamp seat; 121. sleeve cavity; 1211. sleeve cavity caulking groove; 122. rake sliding groove; 123. clamp seat step; 13. handle inner matching groove; 14. press key positioning groove; 15. handle inner locking board; 151. handle locking hole; 16. sleeve; 161. sleeve fillet; 17. handle hanging hole; 2. press transmission member; 21. press key body; 22. press key positioning board; 23. transmission connection portion; 231. transmission connection portion shaft hole; 232. transmission connection portion pivot shaft; 233. press transmission member reset spring; 234. transmission connection portion lug seat; 235. locking member connection groove; 3. locking member; 31. locking member snap-fit portion; 311. locking member snap-fit portion transition section; 312. locking member snap-fit portion lateral section; 32. locking member connection shaft; 4. hand-press handle; 41. hand-press handle inner cavity; 42. hand-press handle snap-fit board; 43. hand-press handle connection block; 5. rake; 51. rake positioning portion; 511. rake pivot connection board; 52. rake claw portion; 521. rake claw portion silica gel; 53. rake pivot shaft; and 54. rake releasing torsion spring.

DETAILED DESCRIPTION

The following detailed description of the embodiments of the present disclosure is provided in conjunction with the accompanying drawings, but the embodiments are not limited to the technical solutions, and any changes in form and not in essence according to the present disclosure should be regarded as the protection scope of the present disclosure.

In the following description, any concept related to the directionality or the orientation of up, down, left, right, front and rear is based on the position shown in the corresponding drawings, and thus should not be construed as a specific limitation to the technical solution provided by the present disclosure.

Referring to FIG. 1 to FIG. 4, shown is a detachable pan handle device with an improved structure. A handle body 1 is included, where the interior of the handle body 1 is hollow and a handle hollow cavity 11 is formed in the interior of the handle body, a lower portion of the handle body 1 is of an opening type design, a handle clamp seat 12 is formed at one end of the handle body 1 in the length direction, and a handle inner matching groove 13 is also formed in the handle hollow cavity 11 and at one end away from the handle clamp seat 12, and the handle inner matching groove 13 is formed at the top position of the handle hollow cavity 11; a press transmission member 2 is further included, where the press transmission member 2 penetrates at an upper position of the handle body 1, and an upper portion of the press transmission member 2 is exposed at an upper portion of the handle body 1, and a lower portion of the press transmission member 2 is arranged in the handle hollow cavity 11 and is pivotally connected with the handle body 1; a locking member 3 is further included, where the locking member 3 is integrally provided in a handle hollow cavity 11 and can be located and locked together with the handle body 1, and one end of the locking member 3 in the length direction is rotatably connected to a lower end of the press transmission member 2; a hand-press handle 4 is further included, where the hand-press handle 4 is integrally arranged at a lower opening of the handle body 1 and can rotate at the opening, and one end of the hand-press handle 4 in the length direction penetrates into the handle clamp seat 12, and the top part of the other end of the hand-press handle 4 in the length direction can be cooperatively connected to the handle inner matching groove 13, and the interior of the hand-press handle 4 is hollow and a hand-press handle inner cavity 41 is formed in the interior of the hand-press handle, the lower part of the press transmission member 2 and the locking member 3 are arranged in the hand-press handle inner cavity 41, and a hand-press handle snap-fit board 42 is further arranged in the hand-press handle inner cavity 41; one end of the locking member 3 away from the press transmission member 2 can be cooperatively locked with the hand-press handle snap-fit board 42; a rake 5 is further included, where the rake 5 passes through the handle clamp seat 12 and is pivotally connected together with the handle clamp seat 12, and the rake 5 is provided with a transversely arranged rake positioning portion 51, the rake positioning portion 51 is fixedly mounted on one end of the hand-press handle 4, and one end of the rake positioning portion 51 away from the hand-press handle 4 is folded downwards to form a rake claw portion 52 corresponding to the handle clamp seat 12, where the rake claw portion 52 is located at a front position of the handle clamp seat 12, and there is a space between the rake claw portion 52 and the handle clamp seat 12, and the edge of the opening of the pan body can be arranged in the space between the rake claw portion 52 and the handle clamp seat 12, and the rake claw portion 52 and the handle clamp seat 12 work together to achieve a clamping operation on the edge of the opening of the pan body.

In this embodiment, a press key positioning groove 14 penetrating into the handle hollow cavity 11 is formed at an upper portion of the handle body 1; and the press transmission member 2 includes a press key body 21, a press key positioning board 22 and a transmission connection portion 23 which are integrally formed, and the integrally formed structure is easy to mount and detach, moreover, the integrally formed structure makes the press transmission member 2 have a high structural strength, making it more reliable and durable; where the press key body 21 passes through the press key positioning groove 14 and can reciprocate therein, the press key positioning board 22 is formed at the bottom of the press key body 21, the press key positioning board 22 is located at a position below the press key positioning groove 14, and the transmission connection portion 23 is formed at a position below one end of the press key positioning board 22 close to the handle clamp seat 12, and the press key positioning board 22 and the transmission connection portion 23 are both accommodated in the handle hollow cavity 11, and the transmission connection portion 23 is pivotally connected with the handle body 1.

Further, a transmission connection portion shaft hole 231 penetrating the left and right ends of the press transmission member 2 is formed on the transmission connection portion 23 of the press transmission member, a transmission connection portion pivot shaft 232 is provided in the transmission connection portion shaft hole 231, the left and right ends of the transmission connection portion pivot shaft 232 penetrate into the handle body 1 respectively and are rotatably connected together, achieving the transmission connection between the press transmission member 2 and the handle body 1, and the press transmission member 2 can rotate about the transmission connection portion pivot shaft 232; a press transmission member reset spring 233 is further provided on the transmission connection portion 23, and two ends of the press transmission member reset spring 233 respectively abut against the transmission connection portion 23 body and an inner side wall of the handle hollow cavity 11; and a pair of transmission connection portion lug seat boards 234 are further formed on one end of the transmission connection portion 23 close to the locking member 3, two transmission connection portion lug seat boards 234 are arranged at intervals, and a locking member connection groove 235 is further formed between the two transmission connection portion lug seat boards 234, one end of the locking member 3 in the length direction is cooperatively provided in the locking member connection groove 235, and the ends of the locking member 3 are connected to the two transmission connection portion lug seat boards 234 by a locking member connection shaft 32.

Figure 2:
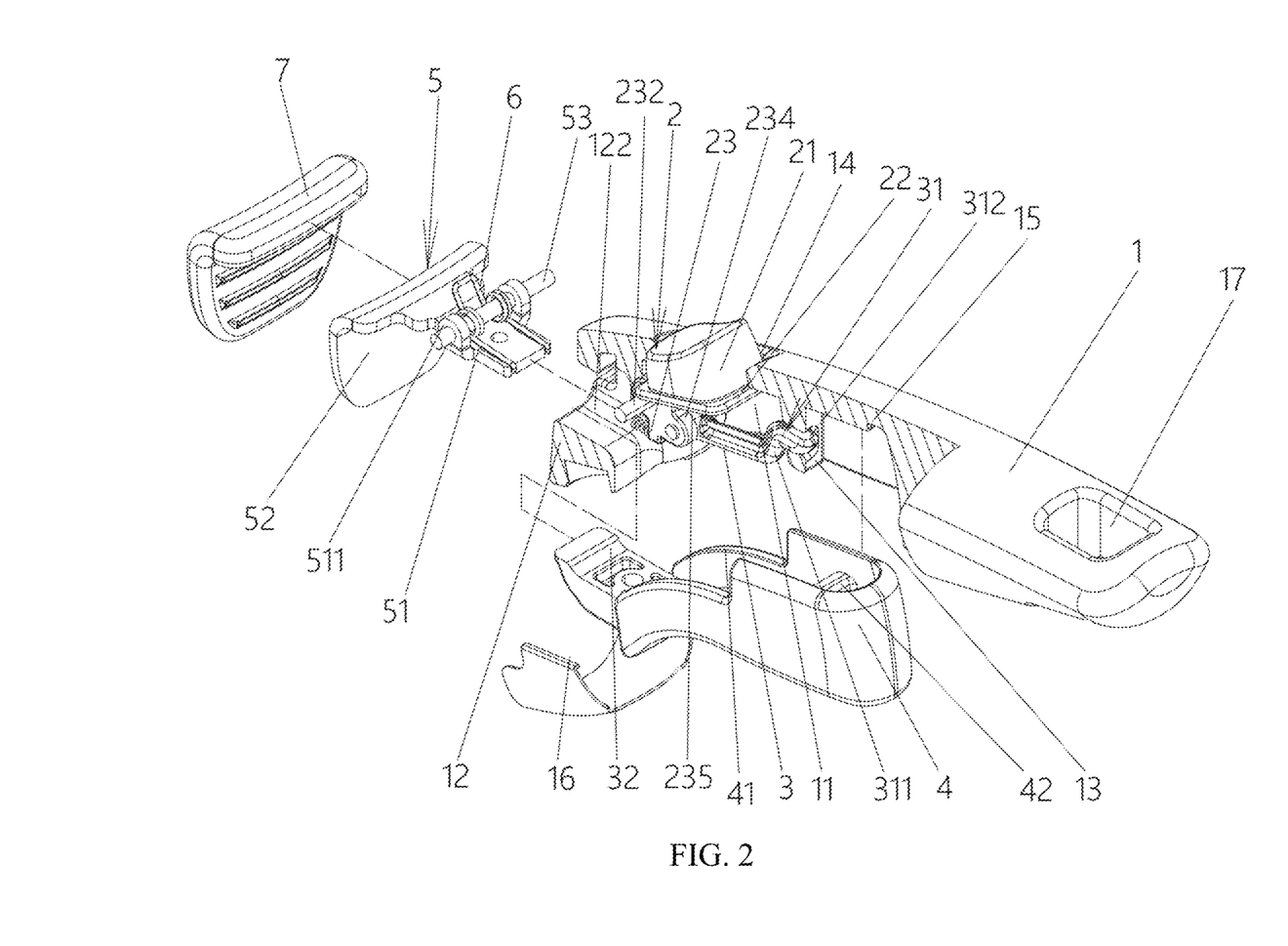
FIG. 2 is an exploded perspective view according to the present disclosure.
Figure 3:
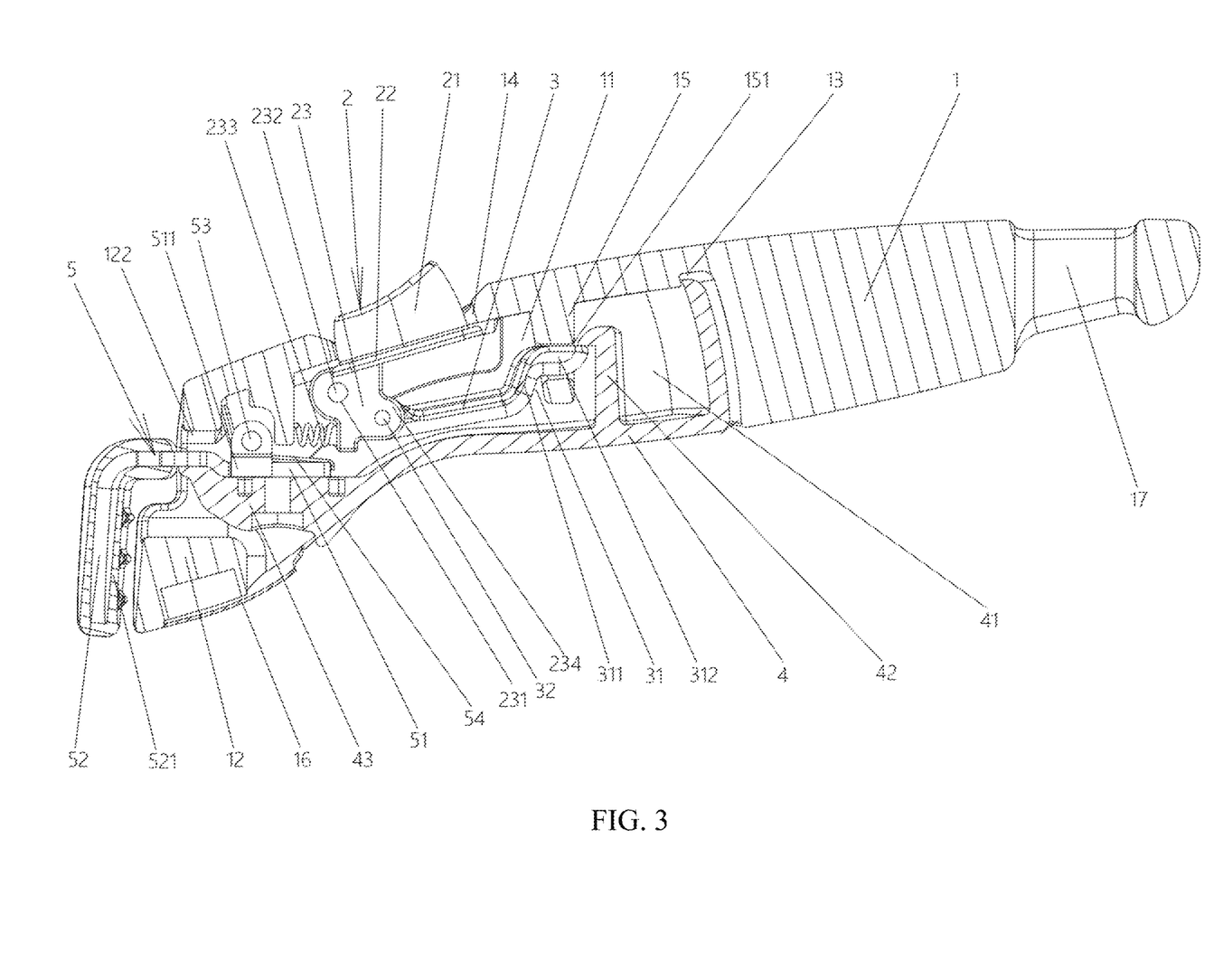
FIG. 3 is a schematic structural diagram according to the present disclosure in a locked state.
Figure 4:
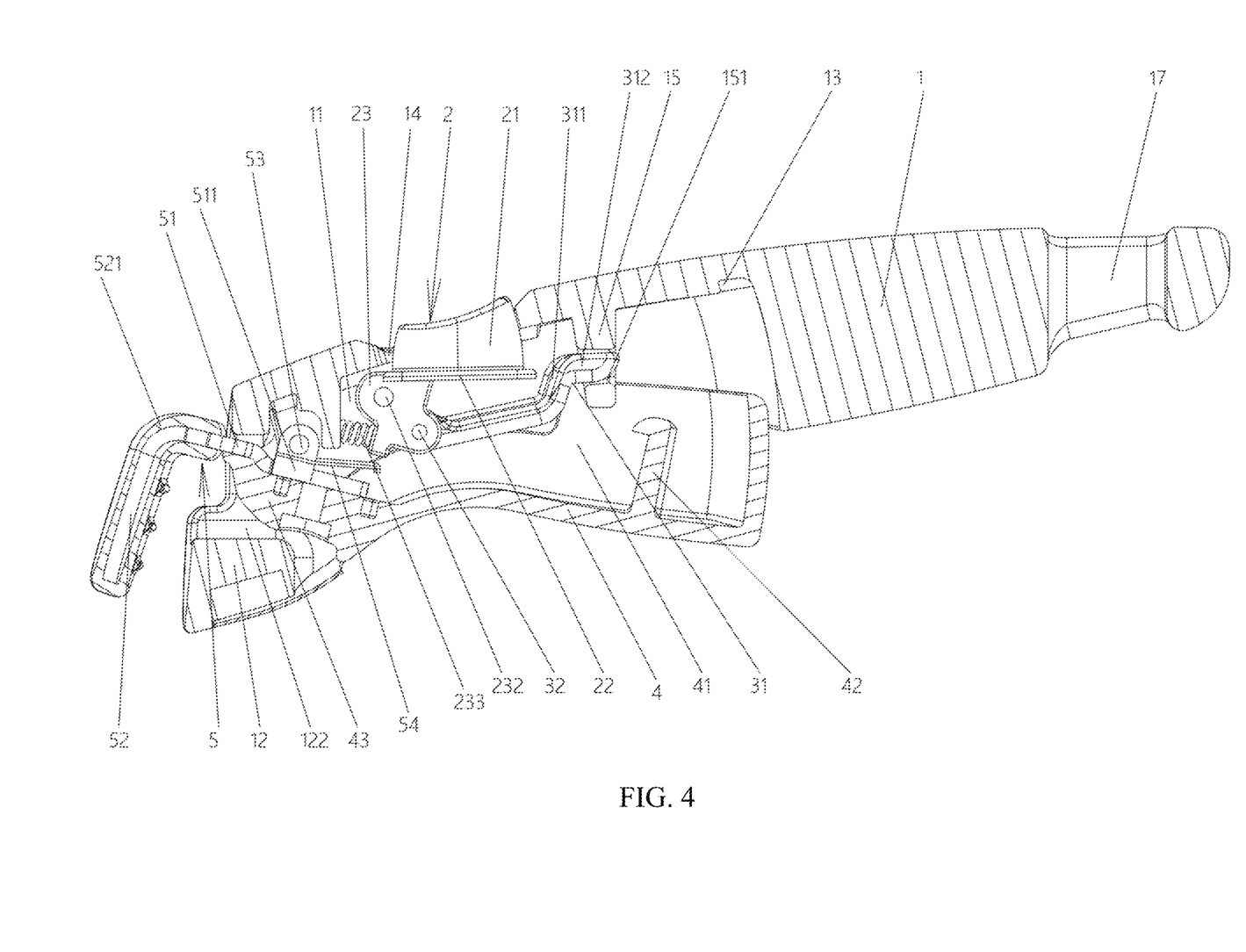
FIG. 4 is a schematic structural diagram according to the present disclosure in a fully opened state.

With reference to FIG. 2 in combination with FIG. 3 and FIG. 4, the locking member 3 is constructed in an elongated shape as a whole, and a locking member snap-fit portion 31 is formed by bending at one end away from the press transmission member 2 of the locking member 3 in the length direction, the locking member snap-fit portion 31 is provided with a vertically arranged locking member snap-fit portion transition section 311 and a laterally arranged locking member snap-fit portion lateral section 312, and a vertically arranged handle inner locking board 15 is further provided in the handle hollow cavity 11, a handle locking hole 151 is further formed on the handle inner locking board 15, and the locking member snap-fit portion lateral section 312 can cooperatively penetrate the handle locking hole 151, and when in a locked state, the locking member snap-fit portion lateral section 312 can be cooperatively locked with an upper edge of the hand-press handle snap-fit board 42. Specifically, as shown in FIG. 3 and FIG. 4, a lateral extension portion is formed on the upper edge of the hand-press handle snap-fit board 42 extending toward the locking member 3, and the lateral extension portion can be fitted on the upper portion of the locking member snap-fit portion lateral section 312, achieving the locking of the locking member 3 with the hand-press handle 4.

In this embodiment, a hand-press handle connection block 43 extending toward the rake 5 is provided at one end of the hand-press handle 4 in the length direction close to the handle clamp seat 12, the hand-press handle connection block 43 passes through the handle clamp seat 12, the rake positioning portion 51 is located at a position above the hand-press handle connection block 43, and the rake positioning portion 51 can be fixedly connected to the hand-press handle connection block 43 by a fastener.

Further, a pair of rake pivot connection boards 511 are formed on the left and right side edges of the rake positioning portion 51 of the rake 5 in an upward direction, two rake pivot connection boards 511 are arranged opposite to each other, and a rake pivot shaft 53 is further provided between the two rake pivot connection boards 511, the rake pivot shaft 53 is cooperatively mounted together with the two rake pivot connection boards 511, and the left and right ends of the rake pivot shaft 53 are rotatably connected together with the handle body 1 to realize the pivot connection between the rake 5 and the handle body 1; and a rake releasing torsion spring 54 is also sleeved on the shaft body of the rake pivot shaft 53, the rake releasing torsion spring 54 is arranged between the two rake pivot connection boards 511, and a part of the body of the rake releasing torsion spring 54 abuts against the inner side wall of the handle hollow cavity 11, and a pair of torsion spring feet of the rake releasing torsion spring 54 are also embedded on the rake positioning portion 51, and the rake releasing torsion spring 54 is configured to assist the rake 5 to perform a release operation, and the rake releasing torsion spring 54 is integrally wound and formed by a spring steel wire. In addition, the rake releasing torsion spring 54 can exert a downward action on the rake positioning portion 51, facilitating the rake 5 to be flipped and making the operation more reliable.

With continued reference to FIG. 1 in conjunction with FIG. 2, a sleeve cavity 121 is formed below the handle clamp seat 12 and a sleeve 16 is fixedly mounted on the sleeve cavity 121; and a sleeve fillet 161 is formed at the top positions of the two sides of the sleeve 16, and a sleeve cavity caulking groove 1211 adapted to the shape of the sleeve fillet 161 is correspondingly provided on the sleeve cavity 121, and the sleeve fillet 161 and the sleeve cavity caulking groove 1211 can be fitted with each other to fixedly mount the sleeve 16 on the handle clamp seat 12.

In this embodiment, the handle clamp seat 12 is provided with a rake sliding groove 122 penetrating the handle inner cavity 11, the rake positioning portion 51 penetrates through the rake sliding groove 122 into the handle inner cavity 11, and a clamp seat step 123 is further formed at the front end of the handle clamp seat 12.

Further, a handle hanging hole 17 is provided at one end of the handle body 1 in the length direction away from the handle clamp seat 12, and the handle hanging hole 17 penetrates the handle body 1 in the thickness direction; and it is possible to quickly and easily hang the handle body 1 integrally on a wall surface or a hook by the handle hanging hole 17.

Preferably, the rake claw portion 52 is sleeved with the rake claw portion silica gel 521.

Figure 1:
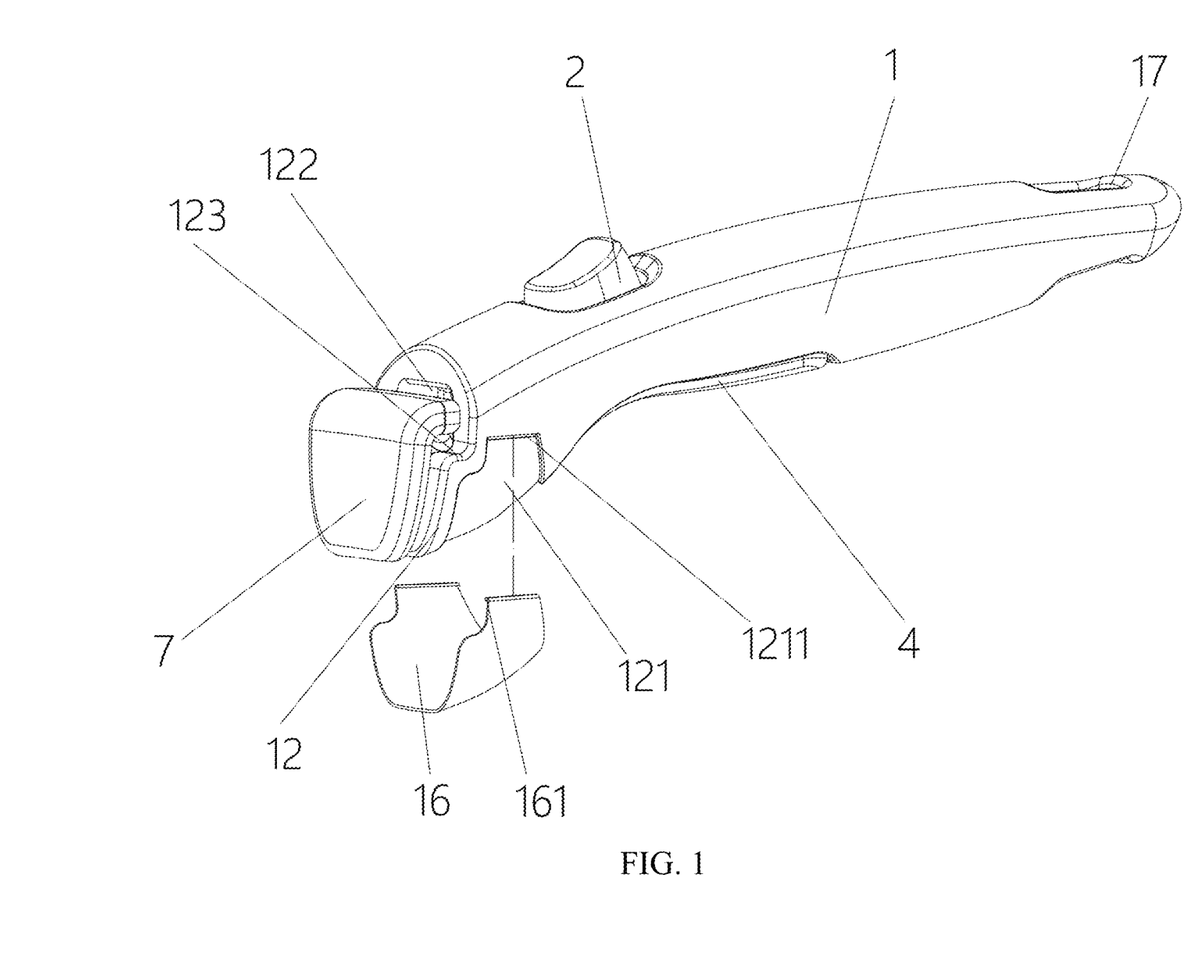
FIG. 1 is a schematic diagram of the overall structure according to the present disclosure.

With continued reference to FIG. 1 and FIG. 2 in conjunction with FIG. 3 and FIG. 4, the applicant describes the principles of operation and use of the present disclosure: the pan handle device of the present disclosure is in a locked state and an opened state; when it is necessary to clamp the edge of the pan by the pan handle device, the user clamps the handle body 1 and the hand-press handle 4 by hands; as shown in FIG. 3, at this time, the locking member snap-fit portion lateral section 312 of the locking member 3 penetrates into the handle locking hole 151 of the handle inner locking board 15, and the upper edge of the hand-press handle snap-fit board 42 is cooperatively locked on the upper portion of the locking member snap-fit portion lateral section 312, the hand-press handle 4 and the handle body 1 are locked together, and the rake claw portion 52 of the rake 5 moves to a position corresponding to the handle clamp seat 12 and maintains a vertical state; the rake claw portion 52 is matched with the handle clamp seat 12 to clamp the edge of the opening of the pan, and at this time, the pan handle device is in a locked state; and when it is necessary to open the pan handle device, i.e., detaching the pan handle device from the pan, a user performs a downward pressing operation on the press key body 21 and releases the hand-press handle 4, the press transmission member 2 rotates integrally around the transmission connection portion pivot shaft 232, and the locking member 3 moves integrally towards the handle clamp seat 12 under the drive of the press transmission member 2, as shown in FIG. 4, the locking member snap-fit portion lateral section 312 of the locking member 3 moves out of the handle locking hole 151, and the upper edge of the hand-press handle snap-fit board 42 is also released from the locking member snap-fit portion lateral section 312 to realize the unlocking operation of the hand-press handle 4 and the handle body 1, and the hand-press handle 4 and the rake 5 rotate around the rake pivot shaft 53 under the action of the rake releasing spring 54, and the hand-press handle 4 rotates at the lower opening of the handle body 1, at this time, the rake positioning portion 51 rotates in the rake sliding groove 122, and the rake claw portion 52 can move obliquely upwards to release the clamping of the edge of the opening of the pan, at this time, the edge of the pan handle device is in a fully opened state, and the hand-press handle 4 is released from the handle body 1; it should be noted that when the press transmission member 2 is inadvertently pressed to rotate downward during use to cause the locking member 4 to be removed from the upper edge of the hand-press handle snap-fit board 42, since the user clamps the hand-press handle 4 tightly, the hand-press handle 4 is always located at a lower opening of the handle body 1, and the rake claw portion 52 of the rake 5 is always maintained in a vertical state and still maintains the clamping action for the edge of the opening of the pan with the handle clamp seat 12, and the operation process is safer and more reliable.

In summary, the technical solution provided by the present disclosure overcomes the defects in the prior art, successfully realizes the objective of the present disclosure, and truly achieves the technical effects stated by the applicant in the above technical effects section.

What is claimed is:

1. A detachable pan handle device with an improved structure, comprising:
    a handle body;
    a press transmission member;
    a locking member;
    a hand-press handle; and
    a rake;
    wherein an interior of the handle body is hollow to define a handle hollow cavity, a lower portion of the handle defines a lower opening, a handle clamp seat is formed at a first end of the handle body in a length direction, a handle inner matching groove is formed in the handle hollow cavity, and a handle inner matching groove is located at a second end of the handle body away from the handle clamp seat;
    wherein the press transmission member passes through an upper position of the handle body, an upper portion of the press transmission member is exposed at the upper portion of the handle body, and a lower portion of the press transmission member is arranged in the handle hollow cavity and is pivotally connected with the handle body;
    wherein the locking member is disposed in the handle hollow cavity and is allowed to be locked together with the handle body, and a first end of the locking member is rotatably connected to a lower end of the press transmission member;
    wherein the hand-press handle is arranged at the lower opening of the handle body and is rotatable at the lower opening, a first end of the hand-press handle in the length direction is inserted into the handle clamp seat, and a top part of a second end of the hand-press handle in the length direction is capable of connecting to the handle inner matching groove, an interior of the hand-press handle is hollow to define a hand-press handle inner cavity, a lower part of the press transmission member and the locking member are arranged in the hand-press handle inner cavity, a hand-press handle snapfit board is arranged in the hand-press handle inner cavity, and a second end of the locking member away from the press transmission member is capable of locking with the hand-press handle snapfit board;
    wherein the rake passes through the handle clamp seat and is pivotally connected with the handle clamp seat, and the rake comprises a rake positioning portion, the rake positioning portion is fixedly mounted on the first end of the hand-press handle, and one end of the rake positioning portion away from the hand-press handle is bent downwards to form a rake claw portion corresponding to the handle clamp seat, and the rake claw portion and the handle clamp seat work together to clamp an edge of an opening of a pan body.

2. The detachable pan handle device with an improved structure according to claim 1, wherein a press key positioning groove communicated with the handle hollow cavity is formed at the upper portion of the handle body; the press transmission member comprises a press key body, a press key positioning board and a transmission connection portion, the press key body passes through the press key positioning groove and is allowed to reciprocate therein, the press key positioning board is formed at a bottom of the press key body, the press key positioning board is located at a position below the press key positioning groove, and the transmission connection portion is formed at a position below one end of the press key positioning board close to the handle clamp seat, the press key positioning board and the transmission connection portion are both accommodated in the handle hollow cavity, and the transmission connection portion is pivotally connected with the handle body.

3. The detachable pan handle device with an improved structure according to claim 2, wherein a transmission connection portion shaft hole penetrating left and right ends of the press transmission member is formed on the transmission connection portion of the press transmission member, a transmission connection portion pivot shaft is provided in the transmission connection portion shaft hole, left and right ends of the transmission connection portion pivot shaft are inserted into the handle body respectively and are rotatably connected to the handle body, achieving a transmission connection between the press transmission member and the handle body; a press transmission member reset spring is provided on the transmission connection portion, and two ends of the press transmission member reset spring respectively abut against the transmission connection portion body and the inner side wall of the handle hollow cavity; and two transmission connection portion lug seat boards are formed on one end of the transmission connection portion close to the locking member, the two transmission connection portion lug seat boards are arranged at intervals, and a locking member connection groove is formed between the two transmission connection portion lug seat boards, the first end of the locking member is arranged in the locking member connection groove, and the first end of the locking member is connected to the two transmission connection portion lug seat boards by a locking member connection shaft.

4. The detachable pan handle device with an improved structure according to claim 1, wherein the locking member is constructed in an elongated shape as a whole, and the second end of the locking member is bent upward to form a locking member snapfit portion, the locking member snapfit portion is provided with a vertically arranged locking member snapfit portion transition section and a laterally arranged locking member snapfit portion lateral section, and a vertically arranged handle inner locking board is arranged in the handle hollow cavity, a handle locking hole is formed on the handle inner locking board, and the locking member snapfit portion lateral section is capable of passing through the handle locking hole, and when in a locked state, the locking member snapfit portion lateral section is locked with an upper edge of the hand-press handle snapfit board.

5. The detachable pan handle device with an improved structure according to claim 1, wherein a hand-press handle connection block extending toward the rake is provided at one end of the hand-press handle in the length direction close to the handle clamp seat, the hand-press handle connection block passes through the handle clamp seat, the rake positioning portion is located above the hand-press handle connection block, and the rake positioning portion is fixedly connected to the hand-press handle connection block by a fastener.

6. The detachable pan handle device with an improved structure according to claim 1, wherein two rake pivot connection boards are formed on left and right side edges of the rake positioning portion of the rake in an upward direction, the two rake pivot connection boards are arranged opposite to each other, a rake pivot shaft is arranged between the two rake pivot connection boards, the rake pivot shaft is allowed to be mounted together with the two rake pivot connection boards, and left and right ends of the rake pivot shaft are rotatably connected with the handle body to connect the rake to the handle body;
wherein a rake releasing torsion spring is sleeved on a shaft body of the rake pivot shaft, the rake releasing torsion spring is arranged between the two rake pivot connection boards, a part of the rake releasing torsion spring abuts against an inner side wall of the handle hollow cavity, two torsion spring feet of the rake releasing torsion spring are embedded in the rake positioning portion, and the rake releasing torsion spring is configured to assist the rake to perform a release operation.

7. The detachable pan handle device with an improved structure according to claim 1, wherein a sleeve cavity is defined in a lower portion of the handle clamp seat, a sleeve is fixedly mounted on the sleeve cavity, sleeve fillets are respectively formed at top positions of two sides of the sleeve, sleeve cavity caulking grooves matched with the sleeve fillets are correspondingly provided on the sleeve cavity, and the sleeve fillets are respectively embedded in the sleeve cavity caulking grooves to fixedly mount the sleeve on the handle clamp seat.

8. The detachable pan handle device with an improved structure according to claim 1, wherein the handle clamp seat is provided with a rake sliding groove communicated with the handle inner cavity, the rake positioning portion passes through the rake sliding groove and is inserted into the handle inner cavity, and a clamp seat step is further formed at a front end of the handle clamp seat.

9. The detachable pan handle device with an improved structure according to claim 1, wherein a handle hanging hole is formed at the second end of the handle body, and the handle hanging hole penetrates the handle body in a thickness direction.

10. The detachable pan handle device with an improved structure according to claim 1, wherein a rake claw portion silicon body is sleeved on the rake claw portion.

\* \* \* \* \*